(12) United States Patent  
Röckelein et al.

(10) Patent No.: US 8,058,754 B2  
(45) Date of Patent: Nov. 15, 2011

(54) LINEAR DRIVE WITH A REDUCED AXIAL FORCE COMPONENT, AS WELL AS A LINEAR COMPRESSOR AND REFRIGERATOR

(75) Inventors: Rudolf Röckelein, Erlangen (DE); Ulrich Weinert, Herzogenaurach (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 545 days.

(21) Appl. No.: 12/224,512

(22) PCT Filed: Jan. 18, 2007

(86) PCT No.: PCT/EP2007/050480  
§ 371 (c)(1),  
(2), (4) Date: Aug. 27, 2008

(87) PCT Pub. No.: WO2007/098990  
PCT Pub. Date: Sep. 7, 2007

(65) Prior Publication Data  
US 2009/0058200 A1  Mar. 5, 2009

(30) Foreign Application Priority Data  
Feb. 28, 2006  (DE) .......................... 10 2006 009 271

(51) Int. Cl.  
*H02K 41/00* (2006.01)

(52) U.S. Cl. ............... 310/12.25; 310/12.24; 310/12.01; 310/27

(58) Field of Classification Search .... 310/12.01–12.33, 310/27, 13, 14  
See application file for complete search history.

(56) References Cited

U.S. PATENT DOCUMENTS

| | | | | |
|---|---|---|---|---|
| 4,638,192 | A | * | 1/1987 | von der Heide ........... 310/12.25 |
| 5,013,223 | A | | 5/1991 | Takahashi et al. |
| 5,175,457 | A | * | 12/1992 | Vincent .......................... 310/15 |
| 5,910,691 | A | * | 6/1999 | Wavre ........................ 310/12.18 |
| 6,081,052 | A | | 6/2000 | Hosoe et al. |
| 6,236,125 | B1 | | 5/2001 | Oudet et al. |
| 6,718,919 | B2 | * | 4/2004 | Muraji ........................ 123/90.11 |

OTHER PUBLICATIONS

International Search Report PCT/EP2007/050480.

* cited by examiner

*Primary Examiner* — Quyen Leung  
*Assistant Examiner* — Leda Pham  
(74) *Attorney, Agent, or Firm* — James E. Howard; Andre Pallapies

(57) ABSTRACT

A linear drive including a stator and a rotor configured for linear reciprocal movement along an axis, with the stator having a magnetic-field guide core having a plurality of legs extending each with one foot substantially toward the rotor, with the rotor having a plurality of magnets disposed in a linear array along the direction of the axis, wherein at least one of a respective one of respective lengths of the magnets along the axis and the respective widths of the legs along the axis and the respective spacings of the legs along the axis are different such that force components of the magnets along the axis will substantially compensate each other when the linear drive is in a de-energized state.

27 Claims, 2 Drawing Sheets

LINEAR DRIVE WITH A REDUCED AXIAL FORCE COMPONENT, AS WELL AS A LINEAR COMPRESSOR AND REFRIGERATOR

BACKGROUND OF THE INVENTION

The invention relates to a linear drive having a stator and a rotor that can move therein back and forth along an axis, with the stator having a magnetizable magnetic-field guide core that has legs extending each with one foot substantially toward the rotor; to a linear compressor, a refrigerating device, in particular a refrigerator and/or freezer or an air-conditioning system, as well as to a method for refrigerating an item and/or compressing a fluid.

Linear drives having permanently energized rotors are selectively moved by appropriately driving the drive coils on the stator by applying a suitable current to them. The coil fields are guided through a magnetizable magnetic-field guide core having poles and are focused onto a region around the rotor.

DE 699 015 86 T2 discloses an electromagnetic linear actuator comprising a stator construction having two poles excited by at least one electric winding. A moving component has a magnet yoke and a magnetizable part, with the moving component having one or two magnets that are permanently magnetized in a direction perpendicular to the plane of the air gap and set into a recess in the moving magnet yoke. A stator part is therein formed from a piece of ferromagnetic material having legs that have feet embodied as polar protuberances.

The problem posed by known solutions is that the rotor is difficult to drive precisely and in particular that its back-and-forth motion cannot always be controlled as precisely as desired. The imprecision of said back-and-forth motion is disadvantageous particularly in association with linear compressors because the compressor piston needs then to be positioned as accurately as possible to minimize a dead volume in the compressor-piston housing: The compressor piston will when moving in an uncontrolled manner strike the piston housing or a valve plate if a safety clearance between the piston housing and compressor piston has been underdimensioned, as a result of which the valve plate, the compressor piston, and the piston rod between the rotor and compressor piston may be damaged. Albeit said problem can be obviated by suitably increasing the safety clearance between the piston housing and compressor piston, the dead volume in the piston housing ought nonetheless to be as small as possible lest the linear compressor's operating efficiency be too adversely affected.

It is known how through a regulating means the imprecision in the back-and-forth motion can be corrected by placing positioning sensors on the rotor and braking it in a timely fashion by driving the drive coils appropriately. Although such braking operations can effectively prevent striking by the compressor piston, they are nonetheless disadvantageous given the need for as great as possible operating efficiency since the braking energy will be lost to the system.

BRIEF SUMMARY OF THE INVENTION

It is hence the object of the present invention to disclose a linear drive, a linear compressor, and a refrigerating device in the case of all of which a back-and-forth motion of the moving parts can be controlled as precisely as possible, as well as to provide a method by means of which items can be refrigerated or a fluid compressed particularly efficiently and reliably and in an energy-saving manner.

Said object is inventively achieved by means of the linear drive, linear compressor, refrigerating device, and method for refrigerating an item and/or compressing a fluid as indicated in the independent claims. Further advantageous embodiments and developments, which can in each case be applied individually or in any combination, are the subject matter of the in each case dependent claims.

As has been shown, the rotor's imprecise positioning is due in substantial part to the reciprocal action between the rotor and stator without any current flowing through the drive coils. The forces between the rotor and stator arise because magnet edges of the permanent magnet on the rotor or changes in said magnet's magnetization act reciprocally with the pole corners on the legs of the stator's magnetic-field guide core. The rotor is in known linear drives even when no current is flowing through the drive coils either pulled toward or pushed away from its rest position depending on its excursion therefrom. The force action due to the reciprocal action will when the rotor or stator is of symmetric design be point-symmetric along the longitudinal axis referred to the rest position. As the force action of the live drive coils should be as independent as possible of the rotor's excursion, said reciprocal action results in undesired distortions in the force-travel characteristic curve, which gives rise to the control-related problems described.

In a first variant the inventive linear drive comprises a stator and a rotor that can move therein back and forth along an axis, with the stator having a magnetizable magnetic-field guide core that has legs extending each with one foot substantially toward the rotor, and provides for at least one foot having an inclined surface. The inclined surface can be embodied as a bevel.

In a second variant the inventive linear drive comprises a stator and a rotor that can move therein back and forth along an axis, with the stator having a magnetizable magnetic-field guide core that has legs extending each with one foot substantially toward the rotor, and provides for the rotor to have a plurality of magnets that are arranged one behind the other in the direction of the axis and whose length corresponds substantially to the sum of a width and a spacing of the legs along the axis.

In a third variant the inventive linear drive comprises a stator and a rotor that can move therein back and forth along an axis, with the stator having a magnetizable magnetic-field guide core that has legs extending each with one foot substantially toward the rotor, with the rotor having a plurality of magnets arranged one behind the other in the direction of the axis, and provides for the respective lengths of the magnets along the axis and/or the respective widths of the legs along the axis and/or the respective spacings of the legs along the axis to be different such that the force components of the magnets along the axis will substantially compensate each other when the linear drive is in the de-energized state.

The portion of the force already present without the effect of current can thereby be limited to less than 30%, in particular to less than 20%, preferably to less than 10% of the nominal force of the linear drive when operating at a constant current.

A force constituent due to reciprocal action between a first foot and a first edge of a first magnet will through suitably dimensioning the lengths, widths, and spacing be at least partially compensated by a force component of a second foot with a second edge of the first or a second magnet. The rotor's force component acting along the axis when the linear drive is in the de-energized state can be matched by harmonizing the lengths of the magnets on the rotor with the widths and spacing of the legs along the axis, with in particular the force constituents due to the individual feet or ends of the magnets at least partially canceling each other.

The stator advantageously has at least one drive coil by means of which a magnetic field can be generated. The stator has a magnetizable magnetic-field guide core consisting particularly of a multiplicity of lamellar plates made of soft magnetic material. The magnetic-field guide core can be embodied as a coil core, meaning it is surrounded at least partially by a coil which under the effect of current causes corresponding magnetizing in the magnetic-field guide core and results in a corresponding concentration of the magnetic field in the region of the rotor. The magnetic-field guide core guides the magnetic field toward the rotor and for that purpose has legs that extend toward the rotor. The legs each have a foot at their free end, which is to say at the end pointing toward the rotor. A foot can have a domed protuberance or projection projecting along the axis beyond the leg.

In an alternative embodiment variant the stator can be furnished with a permanent magnet and not have a drive coil; the drive coil will in that case be provided on the rotor.

It has been shown that an undesired axial force component due to the reciprocal action between the foot and rotor can be reduced through at least one foot's having an inclined surface. The inclined surface can be formed by beveling. The inclined surface can be either flat or curved, with curving able to be convex or concave. What is preferred is a convex surface, meaning an outwardly curved one.

The three variants can be employed together or mutually independently. A combination of the first and second variant and a combination of the first and third variant are especially preferred.

The invention overcomes the disadvantage of known solutions namely that the reciprocal action between the poles or feet and rotor gives rise to force components that overlay the actual force produced by the coil current and give the rotor an asymmetric force-travel profile. Asymmetry is substantially reduced and the rotor rendered significantly easier to control. The linear drive can as a result be operated precisely and efficiently, meaning with only a few or no braking operations notwithstanding high positioning accuracy. A high degree of reliability is achieved.

It is advantageous to embody the foot as having a shape that takes account of the reciprocal action between the foot and rotor also when the drive coil is in the de-energized state.

What is to be understood by uneven force components are force components that are point-symmetric referred to a symmetry point and can be represented with the aid of an uneven polynomial. Even force components are force components that are mirror-symmetric referred to a symmetry point and can be represented by means of a polynomial having exclusively even exponents. By selecting the appropriate lengths, spacing, and widths relative to each other the portion for which the uneven force components along the axis account of the total force along the axis or, as the case may be, the portion for which the force components along the axis that are already present without the effect of current account of the linear drive's nominal total force along the axis under the effect of current can be reduced to less than 30%, in particular less than 20%, preferably less than 10%.

The total force is the maximum force experienced by the rotor when the linear drive is operated at the constant nominal operating current assigned to it.

The respective magnets and feet will owing to the different lengths, widths, and spacings reciprocally interact such that a force action in the axial direction in the de-energized state will be reduced. The reduction in the force components relates always to the rotor's operating range, which is to say it relates only to the force components occurring within the rotor's working stroke. No account is taken here of force components outside the operating range.

In the various variants the reciprocal action between the rotor and the legs of the magnetizable magnetic-field guide core on the stator is influenced such that undesired axial force components already present when the linear drive is in the de-energized state will be reduced.

In one embodiment an outer foot in a position referred to the direction of the axis has an inclined surface. In particular both outer feet have an inclined surface. Local distorting of the magnetic field at the outer foot will be reduced with the aid of the inclined surface, as the result of which force components acting in the longitudinal direction will be reduced.

In another embodiment a foot has a projection pointing toward at least one adjacent foot. In particular two projections are provided on a foot that each point toward the adjacent feet. The force components in the longitudinal direction can be influenced through combining an inclined surface on a foot and a projection on the same and/or another foot. The projections are therein advantageously provided on the inner feet along the axis, with in each case two projections being provided on one foot.

An inclined surface and a projection are advantageously provided on each of the two outer feet. The projection can be provided on an inner foot in an inner position referred to the direction of the axis.

The projection can also be provided on an outer foot in an outer position referred to the direction of the axis.

A spacing between the two along the axis can owing to the projection be reduced by at least 15%, in particular by at least 20%, preferably by at least 25%. The spacing between two adjacent legs can hence be reduced by more than 15%, in particular by more than 40%, or by more than 50% if the two adjacent legs each have a projection pointing toward the other.

The projection can be trapezoidal in longitudinal section along the axis. An axial longitudinal section of an inclined surface advantageously corresponds substantially to a projection's axial longitudinal section.

The inclined surface can be formed by a flat surface that is inclined with respect to the axis and has an angle with respect to the axis in the range of 20° to 70°, in particular in a range of 20° to 60°, preferably in a range of 40° to 50°. The inclined surface can also be curved, being in particular convex, meaning outwardly curved.

In a further embodiment an inner leg and two legs that are here adjacent along the axis are provided. The stator advantageously has at least two drive coils whose winding direction is substantially perpendicular to the axis and which are each located on one side of the axis. The magnets are magnetized in a direction perpendicular to the axis.

The stator can have at least one drive coil, in particular at least two drive coils arranged opposite referred to the rotor. The drive coil has a coil axis which particularly in the foot region of the legs is substantially perpendicular to the axis.

The rotor advantageously has a plurality of magnets arranged along the axis one behind the other and having alternately opposing polarity, in particular a plurality of magnets arranged one behind the other having alternately opposing polarity in a direction perpendicular to the axis. The magnetic field of a magnet at the poles is advantageously at least 0.6 tesla, preferably at least 0.8 tesla.

In an advantageous embodiment the rotor has a plurality of magnets that are arranged one behind the other in the direction of the axis and have different lengths.

For example three magnets can therein be arranged one behind the other, with the two outer magnets having the same length that is different from that of the inner magnet located between the two outer magnets. The magnets are therein arranged symmetrically, but the effect of the different lengths is that a force due to a first leg and first magnet and acting in a direction along the axis will be at least partially compensated by a force due to a second leg and second magnet and acting in the opposite direction along the axis.

The stator can similarly have more than three legs whose widths are different. The stator can furthermore have more than three legs, with the spacings therebetween along the axis being different. Mutual compensating of the force constituents in the axial direction can also be effected by way of dimensioning the legs' widths and respective spacing.

In a preferred embodiment the rotor has a plurality of magnets that are arranged one behind the other in the direction of the axis and whose respective lengths relative to the respective widths and spacing of the legs along the axis are dimensioned such that the individual magnets' force constituents along the axis without the effect of current will compensate each other at least partially, in particular such that a maximum force constituent acting along the axis without the effect of current in a drive coil will across the rotor's working stroke be smaller than 30%, in particular smaller than 20%, preferably smaller than 10% of the maximum force constituent acting along the axis during operation under the effect of current. The maximum force constituent is determined on the linear drive within the operating range at a constant maximum nominal coil current. An undesired total force along the axis will be substantially reduced through superimposing and overlaying of the individual force constituents. That will make the linear drive easier to regulate and hence insure improved controlling of the rotor's back-and-forth motion.

In a special embodiment the inventive linear drive has at least one of the following features ($\alpha 1$) to ($\alpha 8$):

- ($\alpha 1$) The legs (5, 6) have in the direction of the axis (3) a width (B1) in the range of 10 mm to 40 mm, in particular 15 mm to 25 mm;
- ($\alpha 2$) the inclined surface (9) has in a direction perpendicular to the axis (3) a height (H1) in the range of 2.5 mm to 5.5 mm, in particular in the range of 3.5 mm to 4.5 mm;
- ($\alpha 3$) the inclined surface (9) has in the direction of the axis (3) a width (B2) in the range of 1 mm to 3 mm, in particular in the range of 1.5 mm to 2.5 mm;
- ($\alpha 4$) the projections (12, 13) have in a direction perpendicular to the axis (3) a height (H2) in the range of 2.5 mm to 5.5 mm, in particular in the range of 3.5 mm to 4.5 mm;
- ($\alpha 5$) the projections (12, 13) have in the direction of the axis (3) a width (B3) in the range of 1 mm to 3 mm, in particular in the range of 1.5 mm to 2.5 mm;
- ($\alpha 6$) the rotor (7) has a length (L1) in the direction of the axis (3) in the range of 30 mm to 100 mm, in particular in the range of 50 mm to 70 mm;
- ($\alpha 7$) the legs (5, 6) have in the direction of the axis (3) a spacing (A1) in the range of 5 mm to 20 mm, in particular 8 mm to 12 mm;
- ($\alpha 8$) a plurality of magnets (22, 23) and a plurality of legs (5, 6) are provided and a length (L2) of the magnets (22, 23) in the direction of the axis (3) corresponds substantially to the sum of the width (B1) and spacing (A1) of the legs (5, 6) along the axis (3).

The features ($\alpha 1$) to ($\alpha 8$) can therein in each case be applied individually or in any combination. What is particularly advantageous is a combination of the features ($\alpha 1$) to ($\alpha 8$).

In a special embodiment at least one foot of the linear drive has an inclined surface and the rotor has a plurality of magnets that are arranged one behind the other in the direction of the axis and whose length corresponds substantially to the sum of the width and spacing of the legs along the axis.

The inventive linear compressor comprises a piston housing, a compressor piston that can move therein back and forth along an axis, and the inventive linear drive. The advantages of the inventive linear drive are transferable to the linear compressor such that a movement of the compressor piston can be regulated particularly precisely, as a result of which the compressor piston can be guided particularly close to the valve plate in the piston housing so that a dead volume can be embodied especially small. The linear compressor's operating efficiency will be increased thereby and the compressing of a fluid, in particular a refrigerant, can be effected efficiently and in an energy-saving manner.

The refrigerating device, in particular a refrigerator and/or freezer or air-conditioning system, comprises the inventive linear drive and/or inventive linear compressor. The refrigerating device can be operated more precisely, more reliably, more efficiently, and in a more energy-saving manner owing to the improved regulability or controllability of the compressor piston's motion.

The inventive method for refrigerating an item and/or compressing a fluid employs the inventive linear drive, inventive linear compressor, and/or inventive refrigerating device. The efficient, reliable, and energy-saving refrigerating of items or, as the case may be, compressing of fluids is enabled by the efficient, reliable, and energy-saving operation of the linear drive, linear compressor, and/or refrigerating device. Particularly efficient refrigerating of items is thus possible.

The compressor piston is advantageously supported contactlessly by means of a gas-pressure bearing, which is to say with the aid of a housing wall having openings, with a fluid that forms a cushion of gas between the compressor piston and housing wall being pressed through the openings.

BRIEF DESCRIPTION OF THE DRAWINGS

Further advantageous specifics and special embodiments are further explained with the aid of the following drawing which is intended not to limit the present invention but solely to illustrate it by way of example. The following are schematics.

DETAILED DESCRIPTION OF THE PRESENT INVENTION

Figure 1:
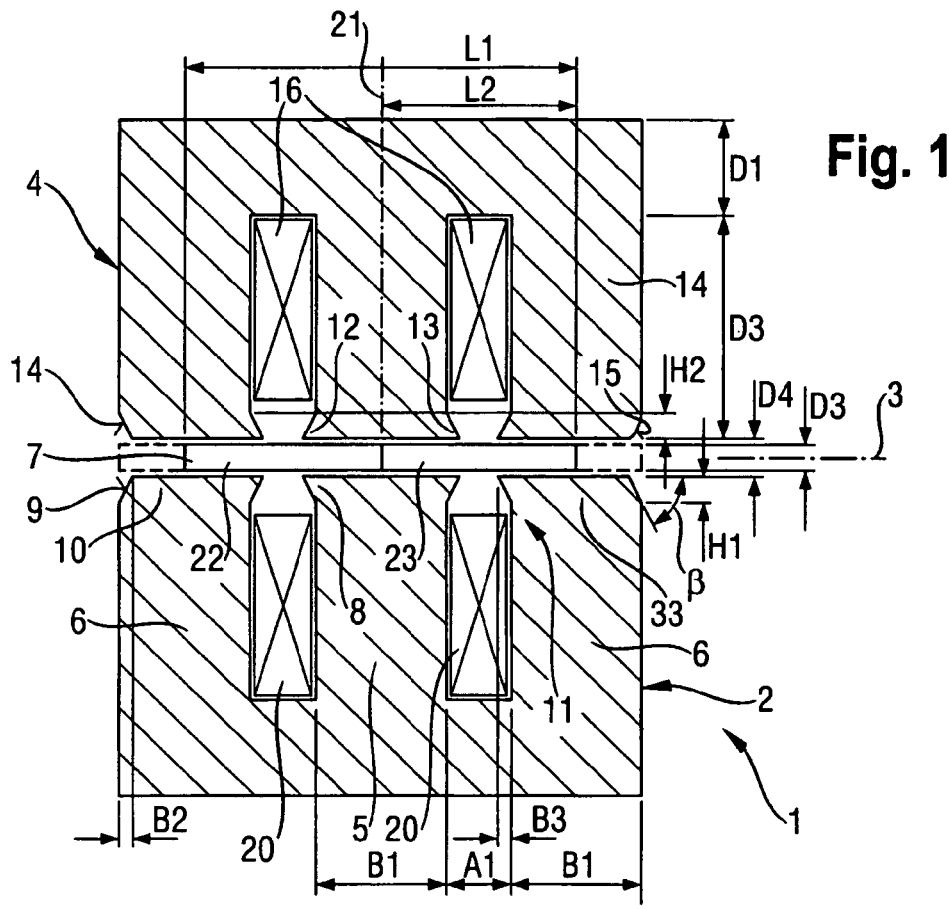
FIG. 1 shows an inventive linear compressor in a longitudinal section along the axis of motion.

FIG. 1 shows the inventive linear drive 1 in a longitudinal section along an axis of motion 3 and along a coil axis 21 of a drive coil 16, 20 on a stator 2. The linear drive 1 has the stator 2 and a rotor 7, with the rotor 7 being moved oscillating back and forth along an axis 3 between two reversing points. The stator 2 has a magnetic-field guide core 4 having an inner leg 5 and two outer legs 6, each of which have feet 8, 33 extending substantially toward the rotor 7. Arranged on the inner leg 5 is an inner foot 8 and arranged on the outer leg 6 is an outer foot 10, 33. The feet 8, 10, 33 have an inclined surface 9 and/or a projection 12, 13. The inclined surface 9 can be embodied as a flat surface 14 or a convexly curved surface 15. The inner foot 8 has a first projection 12 and a second projection 13 each pointing toward the adjacent outer feet 10, 33. The projections 12, 13 are trapezoidal in longitudinal section along the axis 3. The rotor 7 has a first magnet 22 and a second magnet 23 that are magnetized in a direction perpendicular to the axis 3 and have opposing polarity. The magnets 22, 23 are magnetized mutually in parallel. The magnets 22, 23 act reciprocally with the feet 8, 10, 33. The stator 2 has drive coils 16, 20 that are arranged opposite referred to the rotor 7 and whose coil axis 21 is perpendicular to the axis 3.

Axial force components acting on the rotor 7, which even with no current flowing through the drive coils 16, 20 act on the rotor 7, are substantially reduced by the projections 12, 13 and inclined surfaces 9; in particular an uneven force component of the rotor 7 along the axis 3 is reduced. The spacing A1 between the legs 5, 6 along the axis 3 is 10 mm. The width B1 of the legs 5, 6 in a direction along the axis 3 is 20 mm. The width B2 of the inclined surface 9 in a direction along the axis 3 is 2 mm. The width B3 of the projections 12, 13 in a direction along the axis 3 is 2 mm. The length L1 of the rotor 7 along the axis is 60 mm. The length L2 of the magnets 22, 23 of the rotor 7 is 30 mm. The height H1 of the inclined surface 9 in a direction perpendicular to the axis 3 is 4 mm. The height H2 of the projections 12, 13 in a direction perpendicular to the axis 3 is 4 mm. The angle $\beta$ is approximately 45°, the length D1 is 15 mm, the length D2 is 35 mm, the length D3 is 4.1 mm, the length D4 is 6 mm.

Figure 2:
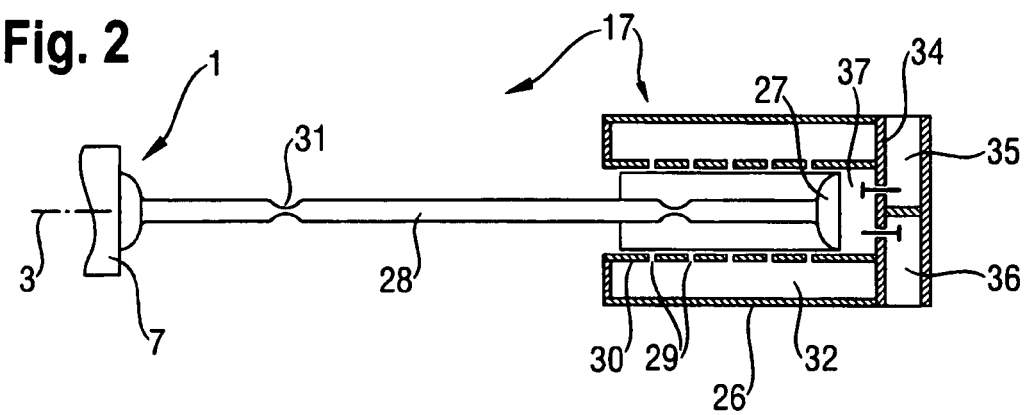
FIG. 2 shows an inventive linear compressor in a longitudinal section along the axis of motion.

FIG. 2 is a sectional view of an inventive linear compressor 17 having an inventive linear drive 1, with a rotor 7 of the linear drive 1 being moveable back and forth along an axis 3. The rotor 7 transmits a force via a piston rod 28 to a compressor piston 17 which in a piston housing 26 is supported contactlessly with the aid of a wall 30 having openings 20 by means of a fluid that is provided via a guide 32 and flows through the openings 29. The piston rod 28 has two narrowings 31. Bending forces can be taken up and skewing avoided with the aid of the narrowings 31, which is of particular importance for the compressor piston 17 supported by gas pressure. The compressor piston 27 is thereby enabled to slide along the wall 30 with as little friction as possible. The piston housing 26 has a valve plate 34 and an intake connection 35 or, as the case may be, a delivery connection 36. The motion of the rotor 7 is rendered easier to control through evening of the forces along the axis 3 and improved precision of the motion of the compressor piston 27 is achieved, which enables closer guiding to a valve plate 34 on the piston housing 26 so that a dead volume 37 in front of the compressor plate 34 can be reduced without striking of the valve plate 34 by the compressor piston 27.

Figure 3:
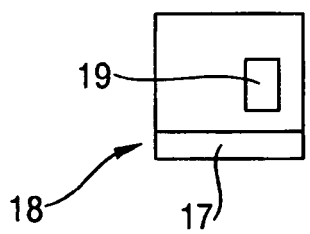
FIG. 3 shows an inventive refrigerating device using the inventive linear compressor shown in FIG. 2.

FIG. 3 shows an inventive refrigerating device 18 which is embodied as a refrigerator, whereby items 18 can be cooled reliably, efficiently and easily. The refrigerating device 18 comprises the inventive linear compressor 17.

Figure 4:
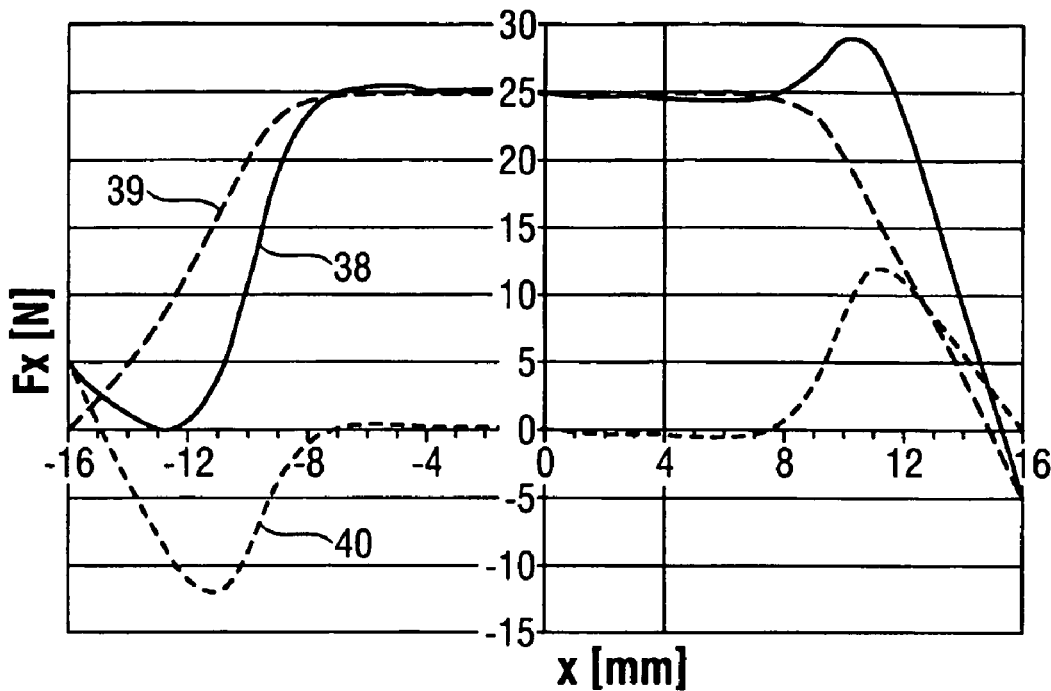
FIG. 4 is a graph showing the individual force constituents acting on a rotor at a constant current and with a known design.

FIG. 4 is a graph showing the force components in the direction of the axis 3 at a constant nominal coil current of a known linear drive. The unbroken line 38 shows the total force acting on the rotor 7. The dashed line 40 shows the uneven portion corresponding to the force when no current is being applied to the drive coil 16, 20, the dashed line 39 shows the even portion that is added when the nominal coil current is being applied to the drive coil 16, 20. It can be seen that with the known linear drive the uneven portion 40 results in substantial asymmetry in the total force 38 so that the rotor 7 must be driven as a function of the displacement path X, which makes regulating or controlling the linear drive 1 much more complex.

Figure 5:
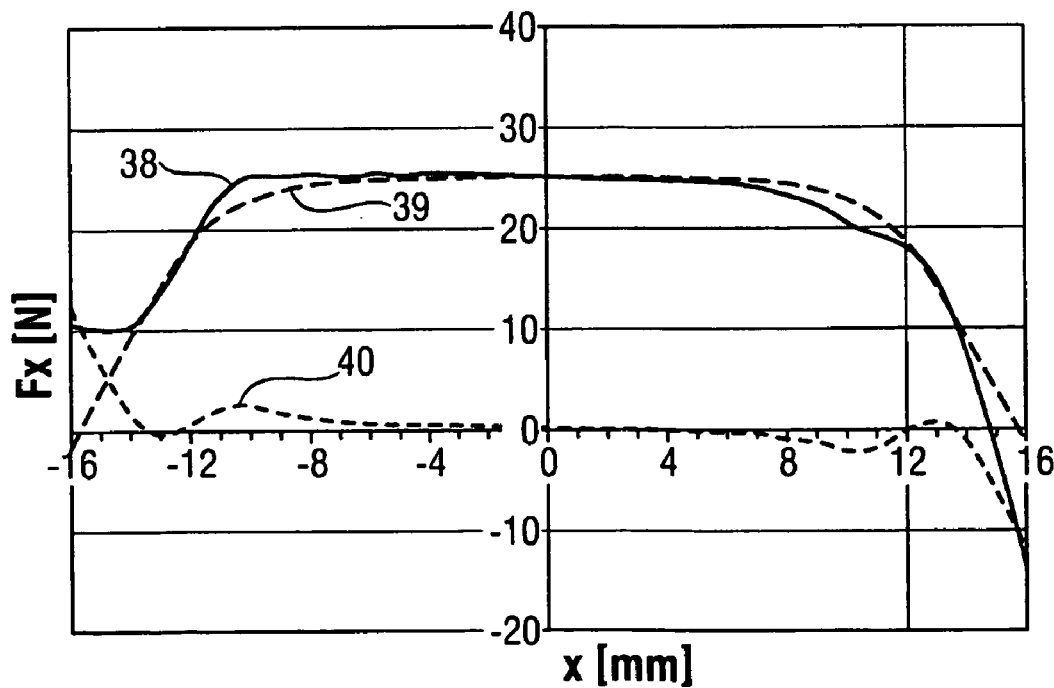
FIG. 5 is a graph showing the individual force constituents acting on a rotor at a constant current and with the inventive linear drive.

FIG. 5 is a graph showing the different force constituents for the inventive linear compressor 1 as a function of the displacement path of the rotor 7 from its central position. It can be seen that the uneven portion of the force component along the axis 3 has been substantially reduced so that the total force is approximately constant over a wide range of about −11 mm to +10 mm. A substantially reduced force acts on the rotor 7 when the drive coils 16, 20 are in the de-energized state.

The invention relates to a linear drive 1 comprising a stator 2 and an axis 3, a rotor 7 that can move back and forth, with the stator having a magnetizable magnetic-field guide core 4 that has legs 5, 6 extending each with one foot 8, 10 substantially toward the rotor 7, with at least one foot 8, 10 having an inclined surface 9, or a plurality of magnets 22, 23 that are arranged one behind the other in the direction of the axis 3, with the respective lengths L2 of the magnets 22, 23 along the axis 3 and the respective widths B1 of the legs 5, 6 along the axis 3 and/or the respective spacings A1 of the legs 5, 6 along the axis 3 being different such that force components of the rotor 7 along the axis 3 will be substantially reduced when the linear drive 1 is in the de-energized state; as well as to a linear compressor, a refrigerating machine, and a method for refrigerating an item or compressing a fluid. What distinguishes the invention is that undesired force components along the axis 3 will be reduced through embodying the foot 8, 10 as having an inclined surface 9 or, as the case may be, through suitably selecting the lengths, widths, and spacing of the legs 5, 6 so that improved regulability or controllability of the back-and-forth motion of the rotor 7 will be achieved.

LIST OF REFERENCE CHARACTERS

1 Linear drive
2 Stator
3 Axis
4 Magnetic-field guide core
5 Inner leg
6 Outer leg
7 Rotor
8 Inner foot
9 Inclined surface
10 Outer foot
11 Foot-side region
12 Projection
13 Projection
14 Flat surface
15 Curved surface
16 Drive coil
17 Linear compressor
18 Refrigerating device
19 Item
20 Drive coil
21 Coil axis
22 First magnet
23 Second magnet
26 Piston housing
27 Compressor piston
28 Piston rod
29 Openings
30 Housing wall
31 Narrowing 32 Guide
33 Outer foot
34 Valve plate
35 Intake connection
36 Delivery connection
37 Dead volume
A1 Spacing between the legs 5, 6 along the axis 3
B1 Width of the legs 5, 6 in a direction along the axis 3
B2 Width of the inclined surface 9 in a direction along the axis 3
B3 Width of the projections 12, 13 in a direction along the axis 3
L1 Length of the rotor 7 along the axis 3
L2 Length of the magnet 22, 23 on the rotor 7
H1 Height of the inclined surface 9 in a direction perpendicular to the axis 3
H2 Height of the projections in a direction perpendicular to the axis 3
β Angle
D1 to D4 Lengths

The invention claimed is:

1. A linear drive comprising a stator and a rotor configured for linear reciprocal movement along an axis, with the stator having a magnetic-field guide core having a plurality of legs extending each with one foot substantially toward the rotor,
wherein at least one foot is formed with an inclined surface, and
the rotor has a plurality of magnets that are arranged one behind the other in the direction of the axis and whose length corresponds substantially to the sum of a width and a spacing of the legs along the axis.

2. The linear drive according to claim 1 wherein at least one outer foot in an outer position extending along the axis is formed with an inclined surface.

3. The linear drive according to claim 1 wherein at least one foot is formed with a projection directed toward at least one adjacent foot.

4. The linear drive according to claim 3 wherein the projection is formed on an inner foot in an inner position with respect to an axial direction.

5. The linear drive according to claim 3 wherein the projection is provided on an outer foot in an outer position with respect to an axial direction.

6. The linear drive according to claim 3 wherein a spacing formed between the legs along the axis is reduced by a projection, the reduction being at least 15%, the reductions reduction being a percentage of a projection free spacing.

7. The linear drive according to claim 3 wherein the projection along the axis is trapezoidal in longitudinal section.

8. The linear drive according to claim 3 wherein an axial longitudinal section of an inclined surface corresponds substantially to an axial longitudinal section of a projection.

9. The linear drive according to claim 3 wherein the at least one foot is formed with two projections, each of which is directed toward an adjacent foot.

10. The linear drive according to claim 1 wherein the inclined surface is formed by a planar surface.

11. The linear drive according to claim 10 wherein the planar surface is inclined with respect to the axis and has an angle with respect to the axis in the range of 20° to 70°.

12. The linear drive according to claim 1 wherein an inclined surface is formed with a curved surface, in particular a convexly curved surface.

13. The linear drive according to claim 1 and further comprising an inner leg and two outer legs adjacent thereto along the axis.

14. The linear drive according to claim 1 wherein the stator includes one drive coil.

15. The linear drive according to claim 14 wherein the drive coil has a coil axis which, particularly in the foot-side region of the legs, is substantially perpendicular to the movement axis.

16. The linear drive according to claim 14, wherein the stator includes two drive coils arranged oppositely with respect to the rotor.

17. The linear drive according to claim 1 wherein the rotor includes a plurality of magnets arranged one behind the other along the axis and having alternately opposing polarity, in particular a plurality of magnets having alternately opposing polarity in a direction perpendicular to the axis.

18. The linear drive according to claim 1 wherein the rotor includes a plurality of magnets are arranged one behind the other in the direction of the axis and have different individual lengths.

19. The linear drive according claim 1 wherein the stator has more than three legs having different individual widths.

20. The linear drive according to claim 1 wherein the stator has more than three legs, with the spacings between the legs along the axis being individually different.

21. The linear drive according to claim 1 wherein the rotor includes a plurality of magnets arranged one behind the other in the direction of the axis and whose respective lengths relative to the respective widths and spacing of the legs along the axis are dimensioned such that the force constituents of the individual magnets along the axis without the effect of current will compensate each other at least partially, wherein a maximum force constituent acting along the axis without the effect of current in a drive coil will be smaller across the working stroke of the rotor than 30% of the maximum force constituent acting along the axis during operation under the effect of current.

22. A linear drive comprising a stator and a rotor configured for linear reciprocal movement along an axis, with the stator having a magnetic-field guide core having a plurality of legs extending each with one foot substantially toward the rotor,
wherein at least one foot is formed with an inclined surface, and
at least one of the legs has a width in the direction of the axis in the range of 10 mm to 40 mm; the inclined surface has a height in a direction perpendicular to the axis in the range of 2.5 mm to 5.5 mm; the inclined surface has a width in the direction of the axis in the range of 1 mm to 3 mm; the projections have a height in a direction perpendicular to the axis in the range of 2.5 mm to 5.5 mm; the projections have a width in the direction of the axis in the range of 1 mm to 3 mm; the rotor has a length in the direction of the axis in the range of 30 mm to 100 mm; the legs have a spacing in the direction of the axis in the range of 5 mm to 20 mm; and a plurality of magnets and a plurality of legs are provided and a length of the magnets in the direction of the axis corresponds substantially to the sum of the width and spacing of the legs along the axis.

23. The linear drive according to claim 1 wherein at least one foot includes an inclined surface and the rotor includes a plurality of magnets arranged one behind the other in the direction of the axis and whose length corresponds substantially to the sum of the width and spacing of the legs along the axis.

24. A linear compressor comprising:
a piston housing;
a piston configured for linear reciprocal movement along an axis; and a linear drive including a stator and a rotor configured for linear reciprocal movement along an axis, with the stator having a magnetic-field guide core having a plurality of legs extending each with one foot substantially toward the rotor, wherein at least one foot is formed with an inclined surface, and the rotor has a plurality of magnets that are arranged one behind the other in the direction of the axis and whose length corresponds substantially to the sum of a width and a spacing of the legs along the axis.

25. A refrigerating device, in particular a refrigerator and/or freezer or air-conditioning system, comprising:

a linear compressor having
- a piston housing;
- a piston configured for linear reciprocal movement along an axis; and
- a linear drive including a stator and a rotor configured for linear reciprocal movement along an axis, with the stator having a magnetic-field guide core having a plurality of legs extending each with one foot substantially toward the rotor,
- wherein at least one foot is formed with an inclined surface, and
- the rotor has a plurality of magnets that are arranged one behind the other in the direction of the axis and whose length corresponds substantially to the sum of a width and a spacing of the legs along the axis.

26. A method for refrigerating an item and/or compressing a fluid including the step of providing at least one of a linear drive including a stator and a rotor configured for linear reciprocal movement along an axis, with the stator having a magnetic-field guide core having a plurality of legs extending each with one foot substantially toward the rotor, wherein at least one foot is formed with an inclined surface, and the rotor has a plurality of magnets that are arranged one behind the other in the direction of the axis and whose length corresponds substantially to the sum of a width and a spacing of the legs along the axis.

27. A linear drive comprising a stator and a rotor configured for linear reciprocal movement along an axis, with the stator having a magnetic-field guide core having a plurality of legs extending each with one foot substantially toward the rotor, with the rotor having a plurality of magnets disposed in a linear array along the direction of the axis, wherein the length of the magnets corresponds substantially to the sum of a width and a spacing of the legs along the axis, and at least one of a respective one of respective lengths of the magnets along the axis and the respective widths of the legs along the axis and the respective spacings of the legs along the axis are different such that force components of the magnets along the axis will substantially compensate each other when the linear drive is in a de-energized state.

* * * * *